UNITED STATES PATENT OFFICE.

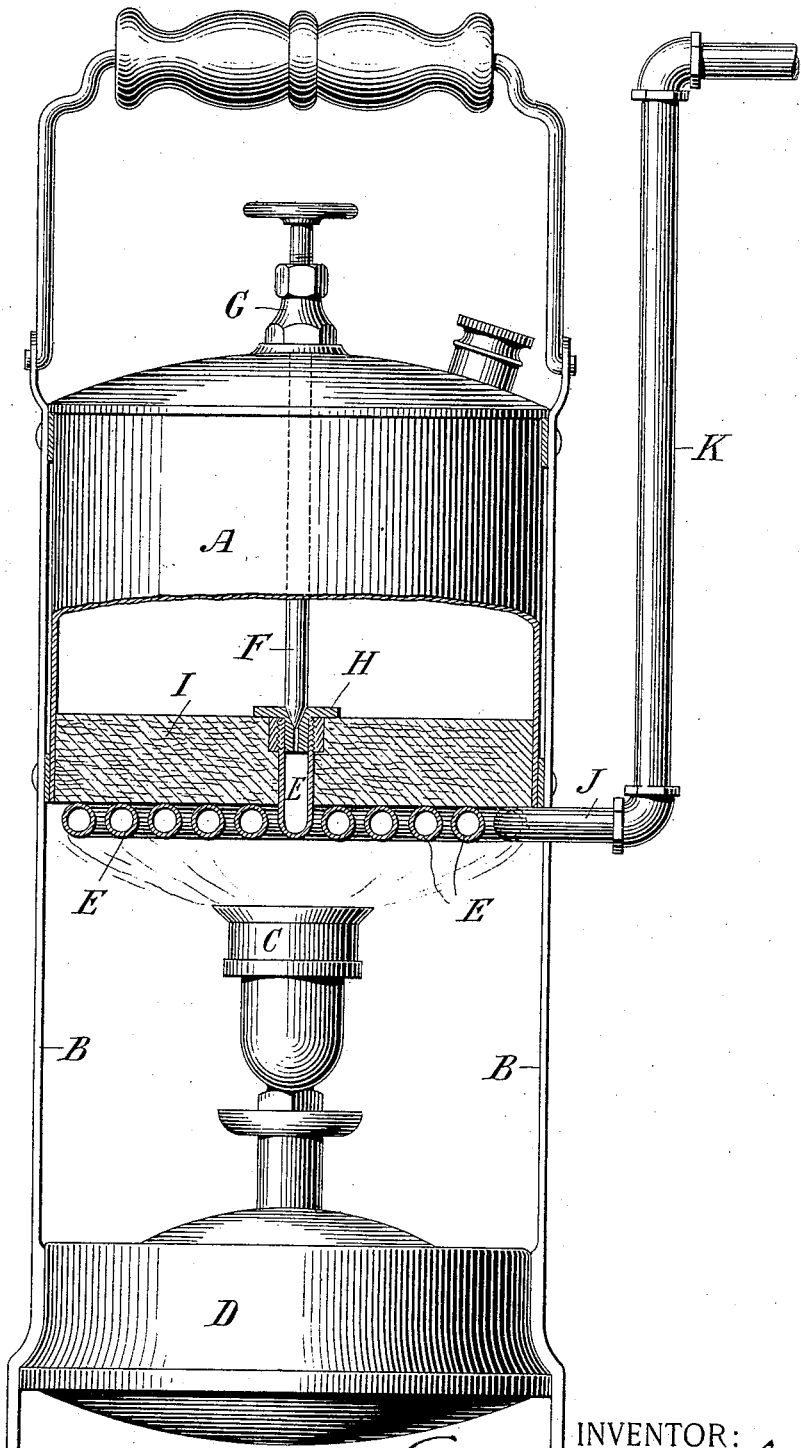

GEORGE L. TAYLOR, OF NEW YORK, N. Y., ASSIGNOR TO RAFAEL E. PARRAGA, OF SAME PLACE.

FUMIGATING DEVICE.

SPECIFICATION forming part of Letters Patent No. 619,700, dated February 14, 1899.

Application filed August 20, 1897. Serial No. 648,875. (No model.)

*To all whom it may concern:*

Be it known that I, GEORGE L. TAYLOR, a citizen of the United States, residing in New York, borough of Manhattan, county of New York, and State of New York, have invented certain new and useful Improvements in Apparatus for Generating Formaldehyde Gas, of which the following is a specification, reference being had to the drawing accompanying and forming a part of the same.

The present improvements relate particularly to apparatus for the regeneration of formaldehyde gas from a commercial aqueous solution and for utilizing such gas for disinfection or effecting germicidal action. Heretofore this gas has been generated from a solution thereof by subjecting the solution to heat in a closed vessel or generator and holding the generated gas confined in the generator until a pressure of at least two atmospheres has been obtained before permitting the gas to escape into the space or into contact with the articles to be disinfected. This method, while partially successful, is still inefficient in respect of best economy, in respect of securing from the solution the maximum of gas, in regard to safety of use, cost, and care of attention in generation, and in the production of the gas in such pure condition as to best fit it to penetrate and act upon articles to be disinfected.

It is not practicable in commercial apparatus and especially in common hand apparatus to employ with safety the high pressure and heat necessary to break up the products of polymerization and resolve them into original formaldehyde gas, especially the products paraformaldehyde and trioxymethylene-isomeric compounds tending to lock up or render unavailable for the purposes of disinfection large percentages of the formaldehyde. Again, it is known that the methyl alcohol usually added to the commercial solution to prevent the precipitation of the paraformaldehyde will act in the common process of generation to reduce the quantity of liberated formaldehyde gas by uniting therewith to form a third product known as "methylal," a substance having no germicidal property, and, further, it is known that the moisture or vapor of water in the gas as heretofore generated acts to reduce the penetrative and germicidal action of the gas by facilitating the formation of the isomer paraformaldehyde.

The process of operating with the present apparatus consists in submitting the commercial solution to a high degree of heat (higher than anything heretofore attempted) by feeding the solution in a fine sheet or stream to and conducting the regenerated gas along a passage, channel, or tube of considerable length, (which is to be openly connected with the space to be disinfected,) and superheating the gas as it progresses through the tube by a source of heat acting on the walls of the passage or tube. As the solution is introduced into the tube and first comes in contact with the heated portions thereof it is instantly vaporized, and as this vapor progresses through the tube it is superheated and brought to a temperature (say 1,000° Fahrenheit) sufficient to thoroughly break up the products of polymerization and to convert by partial oxidation the methyl alcohol into formaldehyde gas.

Thus I generate from a given solution the maximum of formaldehyde gas in purest form and without the danger attending the use of high pressures and without the necessity of the exercise of any special skill or attention in working the apparatus.

Referring to the drawing accompanying this application, the figure shown illustrates a hand-generator adapted to practice my process.

A is a cylindrical reservoir supported by the uprights B, which also carry a lamp or other source of heat, G being the lamp, and D its fount.

E is a spirally-arranged copper tube, one end of which opens into the reservoir A and is controlled by a needle-valve F, the stem of which is threaded in the stuffing-box G in the top of the generator, so as to render the valve adjustable to and from its seat H.

I is the bottom of the reservoir, which is preferably composed of asbestos or some other non-conductor of heat. I utilize this non-conductor for the purpose of preventing any excess application of heat to the contents of the reservoir, and so that I can arrange the reservoir over the lamp in a form of apparatus most compact and convenient for handling. The other end of the copper coil J connects with a pipe K, which is connected to the place or space where it is desired to use the formaldehyde gas.

Assuming that the reservoir contains a quantity of solution of formaldehyde, the lamp will be lighted and in a few moments will bring the regenerating-coil to a high heat, practically incandescent heat. Then the needle-valve will be slightly raised and the contents of the reservoir permitted to pass under gravity in a fine stream into the coil. When the solution strikes the heated portion of the coil, it immediately vaporizes, and this vapor, progressing through the coil, is heated to a sufficiently high heat to reduce or break up the products of polymerization and at the same time convert by partial oxidation the methyl alcohol into formaldehyde gas.

The gas resulting from the practice of this process will be found to be penetrative to a greater extent than heretofore known, as also greater in quantity from a given solution and with less of deposit on or combination with the material of the articles treated.

The apparatus needs no special attention during the generation of the gas, as the matter of pressure is not an incident, and the generation of gas is not intermittent, but goes on continuously and automatically.

What is claimed as new is—

The herein-described apparatus adapted to be used in the regeneration of formaldehyde gas, consisting of a reservoir adapted to contain a solution, having a bottom of non-heat-conducting material, a coil arranged close under such bottom, a heater for such coil, and a controllable liquid-passage from the interior of such reservoir into the coil, substantially as described.

GEORGE L. TAYLOR.

Witnesses:
ROBT. F. GAYLORD,
JAMES N. CATLOW.